(12) United States Patent
Nam et al.

(10) Patent No.: US 8,783,394 B1
(45) Date of Patent: *Jul. 22, 2014

(54) DRIVE WHEEL SUSPENSION

(75) Inventors: Ki Y. Nam, Newport Coast, CA (US); Richard Taras, Anaheim, CA (US); Kenneth Tien Cao, Laguna Niguel, CA (US)

(73) Assignee: T3 Motion, Inc., Costa Mesa, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/468,875

(22) Filed: May 10, 2012

(51) Int. Cl.
*B62D 61/06* (2006.01)

(52) U.S. Cl.
USPC ............. 180/61; 180/215; 180/213; 180/210; 180/211; 180/214; 180/217; 180/65.51; 180/65.1; 903/902

(58) Field of Classification Search
None
See application file for complete search history.

(56) References Cited

U.S. PATENT DOCUMENTS

| | | |
|---|---|---|
| 3,190,676 A | 6/1965 | Junge |
| 3,433,318 A | 3/1969 | Packard |
| 3,512,599 A | 5/1970 | Hott et al. |
| 3,570,620 A | 3/1971 | Fisher et al. |
| 3,964,563 A | 6/1976 | Allen |
| 4,263,977 A | 4/1981 | Willett |
| 4,541,501 A | 9/1985 | Kawasaki |
| 5,307,889 A | 5/1994 | Bohannan |
| 5,960,901 A | 10/1999 | Hanagan |
| 7,237,637 B2 | 7/2007 | Fecteau et al. |
| 7,789,175 B2 | 9/2010 | Tobey et al. |
| 7,841,436 B2 | 11/2010 | Bussinger |
| 8,292,010 B2 | 10/2012 | Puskar-Pasewicz et al. |
| 8,397,854 B1 * | 3/2013 | Nam et al. ............... 180/213 |
| 8,561,736 B2 | 10/2013 | Nelson et al. |
| 2010/0071983 A1 | 3/2010 | Holland |
| 2010/0292840 A1 | 11/2010 | Ruan et al. |
| 2013/0025957 A1 | 1/2013 | Ellsworth |
| 2013/0175103 A1 | 7/2013 | Flowers |

OTHER PUBLICATIONS

"Notice of Allowance Dated Nov. 13, 2012, U.S. Appl. No. 13/405,127" (Nov. 13, 2012).
"Notice of Allowance Dated Nov. 4, 2013; U.S. Appl. No. 29/433,682", (Nov. 4, 2013).

* cited by examiner

*Primary Examiner* — J. Allen Shriver, II
*Assistant Examiner* — Hilary L Johns
(74) *Attorney, Agent, or Firm* — Blakely Sokoloff Taylor & Zafman LLP

(57) ABSTRACT

A drive wheel and suspension for a vehicle for mounting on a steering post to provide both a steering capability and propulsion to the vehicle. The drive wheel and suspension provides a spring suspension for that wheel of the vehicle, as well as what is effectively vehicle body mounting of the propulsion system so as to minimize un-sprung weight and to provide a compact assembly to support a suitable aesthetic and protective fender over the drive wheel and suspension.

9 Claims, 7 Drawing Sheets

DRIVE WHEEL SUSPENSION

BACKGROUND OF THE INVENTION

1. Field of the Invention

The present invention relates to the field of front drive wheel suspension for vehicles.

2. Prior Art

T3 Motion, Inc., assignee of the present invention, now manufactures and sells the three-wheeled battery operated vehicle shown in FIG. 1. The vehicle is operated standing up, with all of the controls necessary being accessible on the handlebars. The vehicle has found wide application for security purposes, as it typically can operate all day in a typical application on a single charge, both indoors such as in shopping centers and outdoors for policing such areas as parking lots, parking structures, beach areas and the like. The vehicle has found wide use for such purposes not only because of its efficiency (cost of operation), but also because the operator is elevated somewhat, so can see over people for a better view of the area.

In the prior art vehicles as shown in FIG. 1, the wheels are rigidly mounted, that is, the rear wheels are rigidly mounted to the frame of the vehicle and the front wheel, which is the drive wheel, is rigidly mounted to an unsprung steering post, as in a typical tricycle. However because of the functionality and practical appeal of the vehicles, the same are being used in environments not having a particularly smooth operating surface, such as by way of example, poorly maintained parking lots and the like where rigid mounting of the vehicle substantially affects performance. A front drive wheel suspension also reduces torque at steering shaft due to the movement of suspension system during initial acceleration. Since the front wheel is the drive wheel as well as the steering wheel, it is important that the wheel remain one the ground, so to speak, and not bounce when going over a rough surface. This could be accomplished by partial deflation of the tire, though this leads to higher rolling friction (less range of a battery operated vehicle), poorer steering characteristics and accelerated wear on the time.

DETAILED DESCRIPTION OF THE PREFERRED EMBODIMENTS

Figure 1:
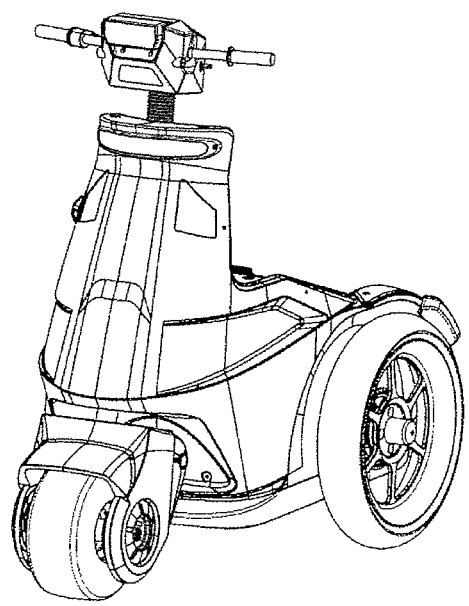
FIG. 1 is a view of a prior art vehicle in which the present invention may be used.
Figure 2:
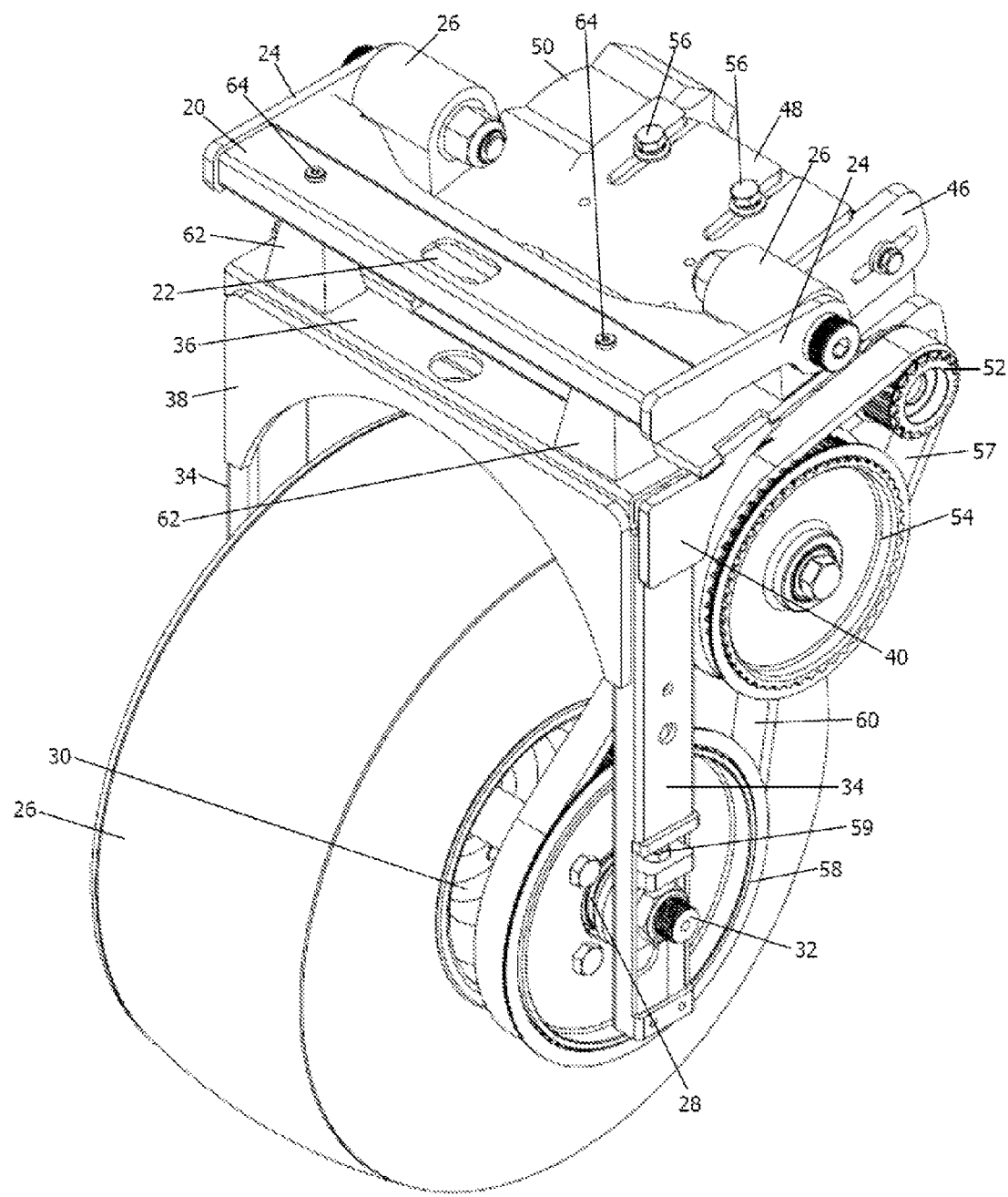
FIG. 2 is a first side perspective view of the suspension and drive of the present invention taken on an expanded scale compared to the subsequent Figures.
Figure 3:
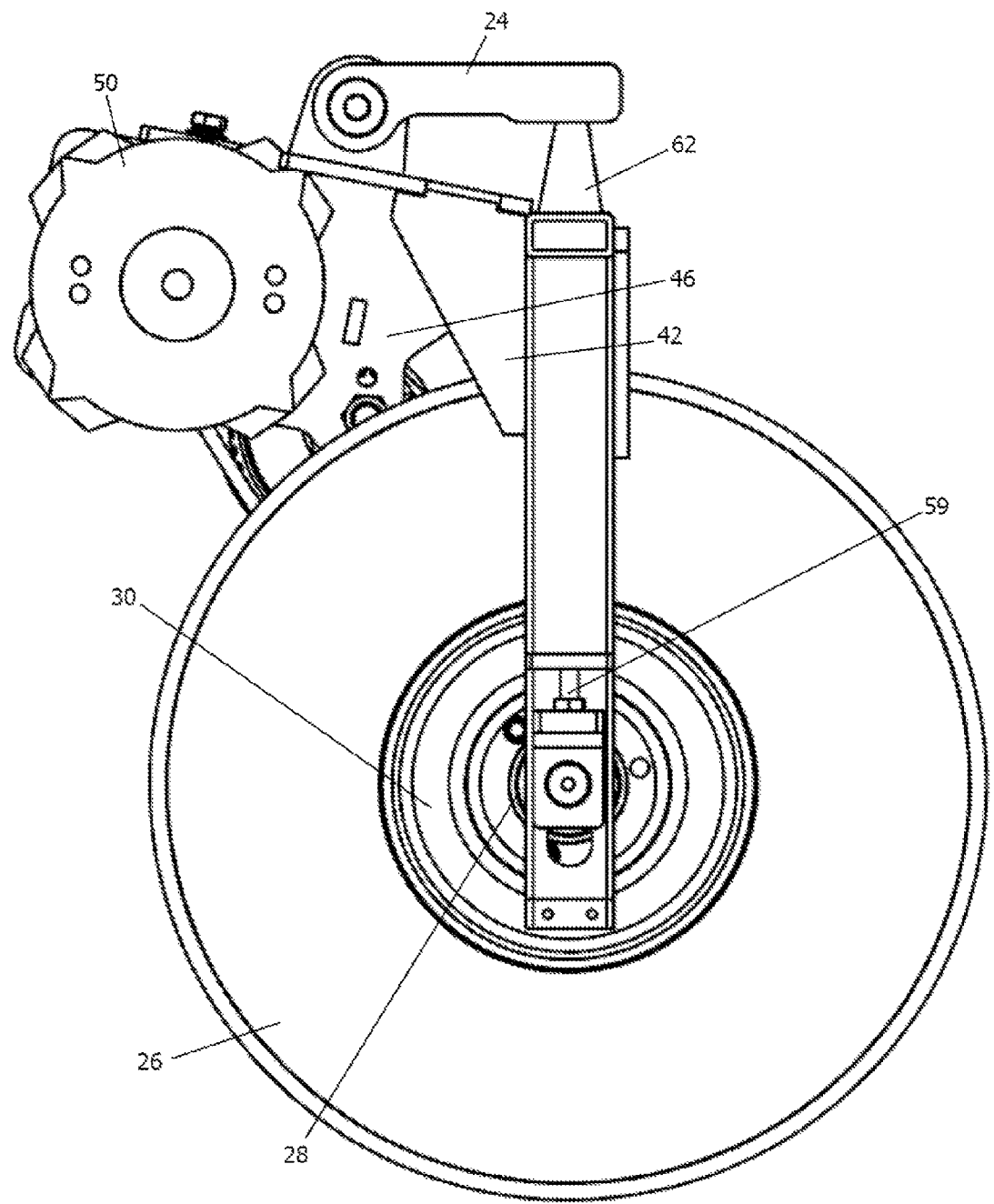
FIG. 3 is a second side view of the suspension and drive system.
Figure 4:
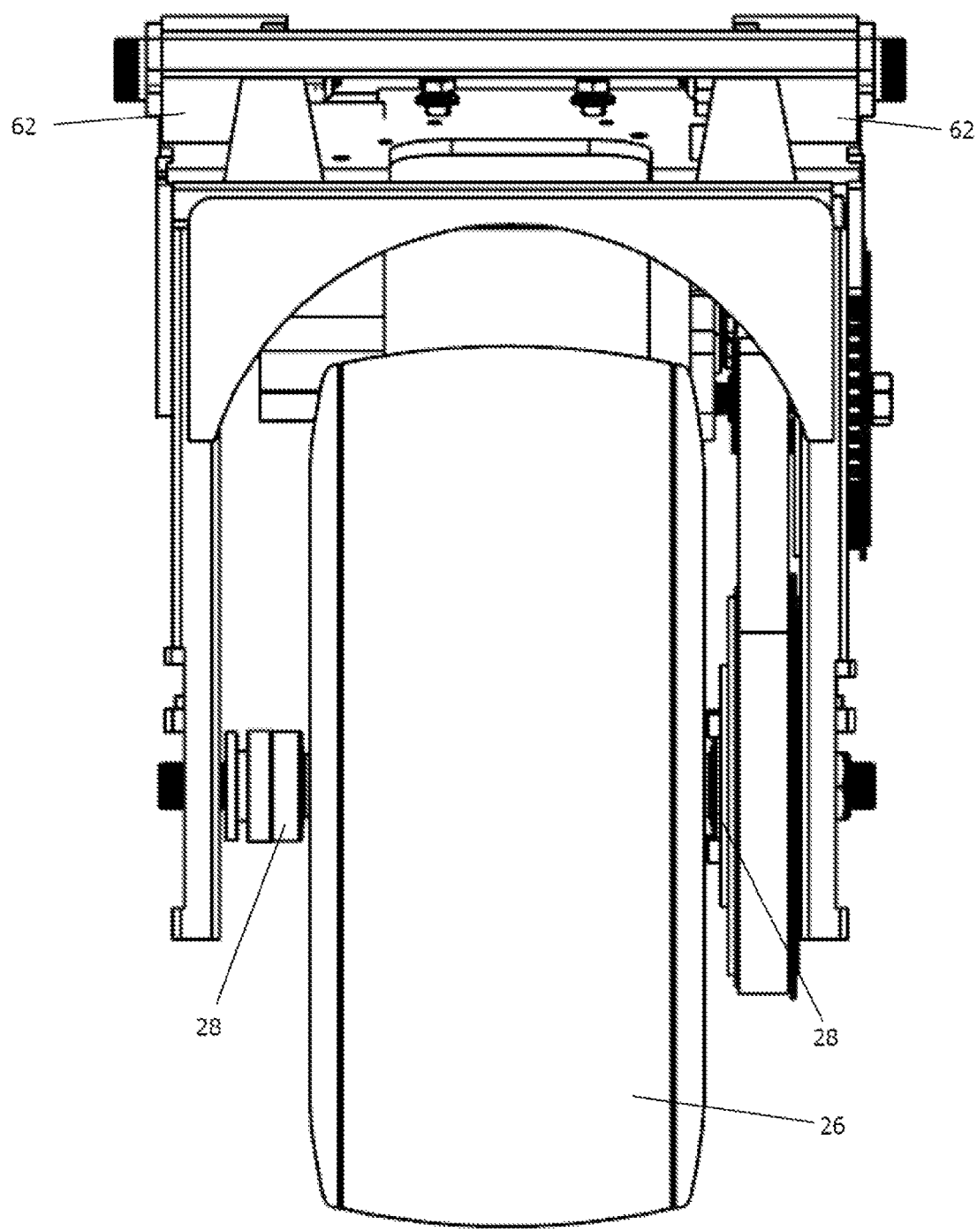
FIG. 4 is a front view of the suspension and drive system.
Figure 5:
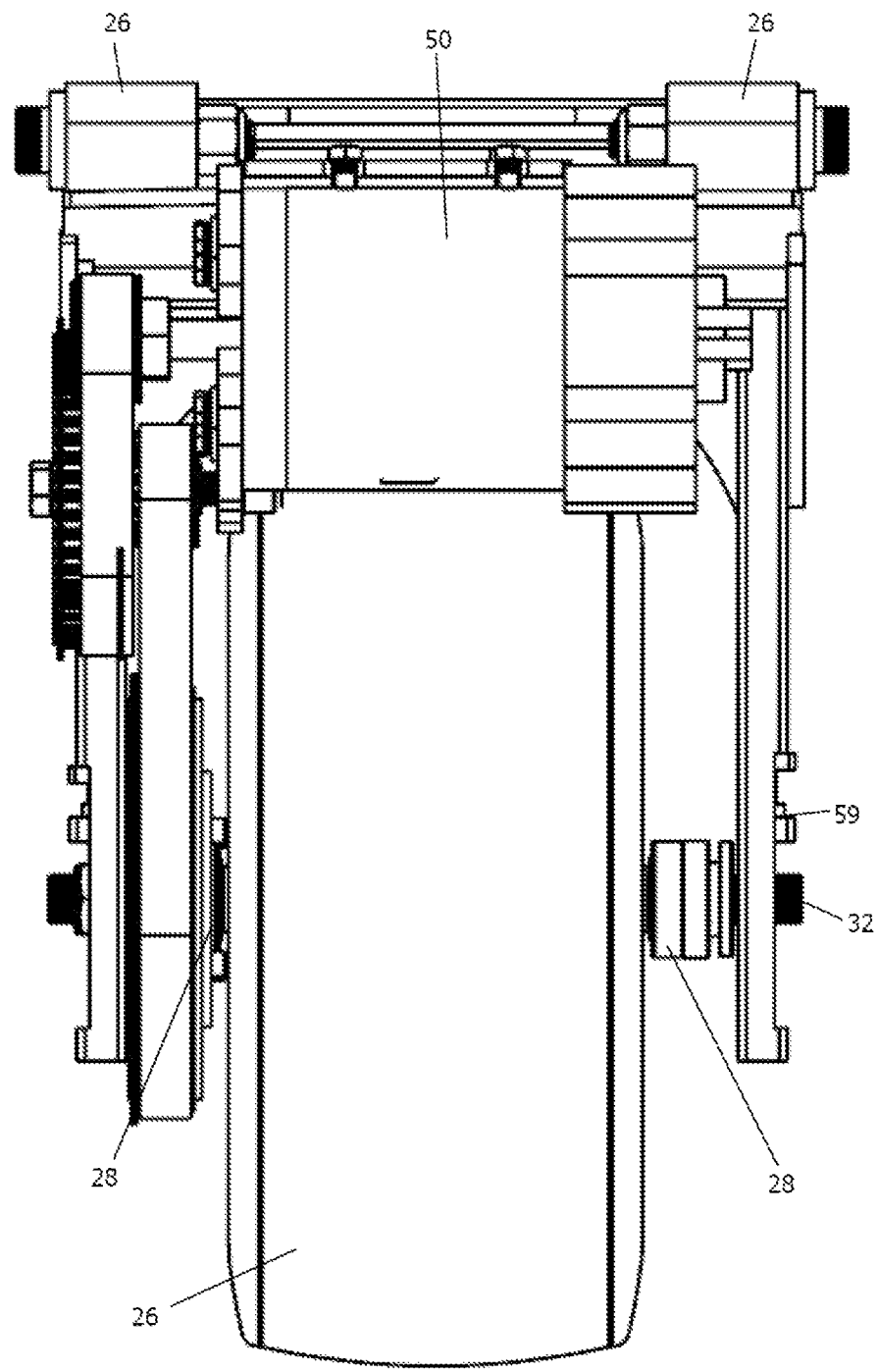
FIG. 5 is a rear view of the suspension and drive system.
Figure 6:
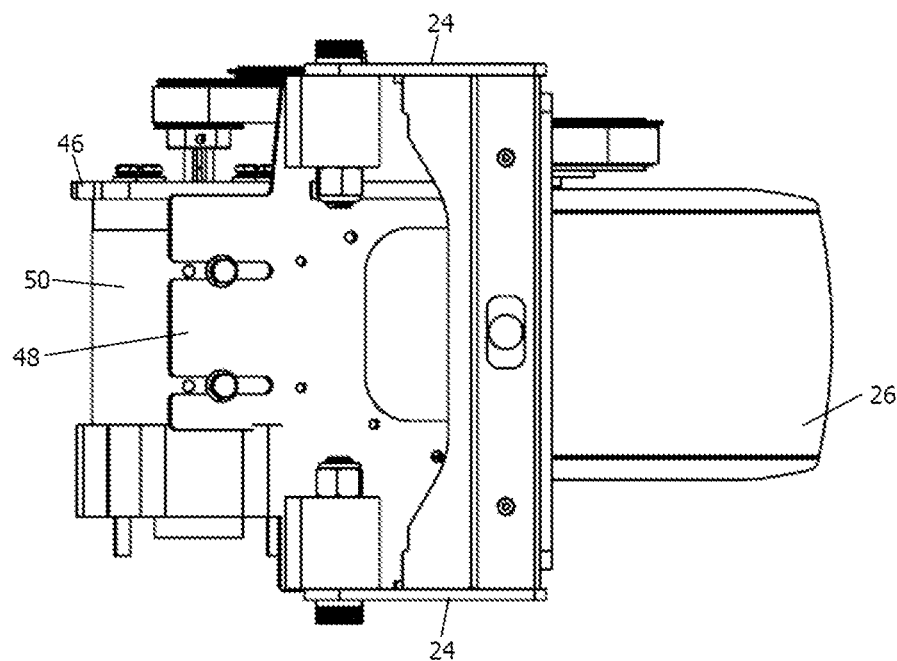
FIG. 6 is a top view of the suspension and drive system.
Figure 7:
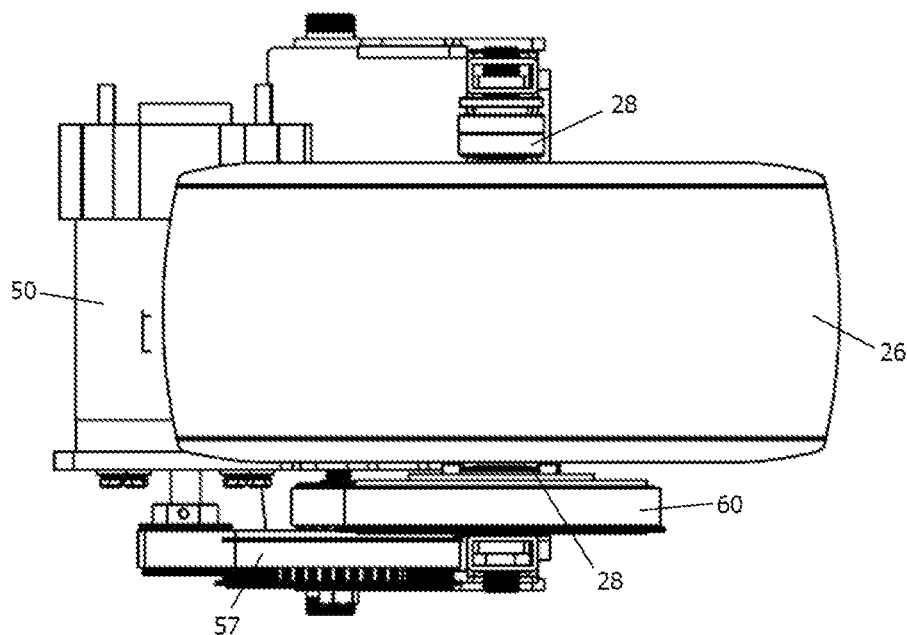
FIG. 7 is a bottom view of the suspension and drive system.

The present invention comprises a resilient drive wheel for an electric powered vehicle such as that shown in FIG. 1. FIG. 2 is a first side perspective view of an exemplary suspension and drive in accordance with the present invention. FIG. 3 is a second side view of the suspension and drive system, FIG. 4 is a front view of the drive and suspension, FIG. 5 is a rear view of the drive and suspension, FIG. 6 is a top view of the drive and suspension and FIG. 7 is a bottom view of the drive and suspension, all of FIG. 2. As may be seen in the Figures, a rectangular tube 20 has an opening or socket into which a steering post for a vehicle such as that shown in FIG. 1 will ultimately be fastened. Rearward projecting members 24 are fastened to bar 20 adjacent their forward ends and are configured to rotate around bearing assemblies 28. Bar 20, rearward projecting members 24 and bearing assemblies 28 are the only part of the assembly which are effectively rigidly connected or to be connected to a vehicle steering post. The rest of the assembly, to be hereafter described, rotates through a limited angle around the axis of bearing assemblies 28 in response to varying upward forces on wheel 30 through tire 26.

In particular, wheel 30 is mounted on bearings on an axle 32 which is supported on substantially vertical struts 34. These, in turn, are connected to a second rectangular tube 36 (an example of the first cross member in claims 1 and 2) with a reinforcing plate 38 providing extra rigidity to the substantially vertical struts 34. Also connected to this assembly are side plates 40 and 46 (FIG. 3) and member 44, as well as motor mounting plate 48. Motor mounting plate 48 supports motor 50 which drives a small toothed sprocket 52 which will drive a larger toothed sprocket 54 supported on bearings on side plate 46 and connected to a smaller toothed sprocket (not visible in the Figures) aligned with a larger toothed sprocket 58 connected to the wheel 30. In the final assembly, toothed sprocket 52 will be coupled to toothed sprocket 54 by a toothed belt 57, and small toothed sprocket coupled to toothed sprocket 54 will be coupled to toothed sprocket 58 through a second toothed belt 60, with the various diameter ratios providing the desired speed reduction between the speed of rotation of the motor and the speed of rotation of the wheel 30. The motor 50 is supported on the motor mounting plate 48 by bolts 56 passing through slots in the motor mounting plate 48 so that the motor may be slid back and forth as required for tensioning the belt between toothed sprocket 52 and toothed sprocket 54. The belt 60 between sprocket driven by toothed sprocket 54 and toothed sprocket 58 is tensioned by adjustment of the vertical position of axle 32 with respect to struts 34 by an adjustment screw 59 at each side of the assembly, which allows the exact position of the axle 32 of the wheel 30 with respect to the struts 34 to be varied. Note that the amount of variation in the final position of the adjustment needed to properly tension the respective toothed belt is small enough as to be non-consequential when the proper size of toothed belt is used.

Thus with the assembly just described it may be seen that the entire assembly, including the wheel and tire, the structure supporting the wheel and tire, as well as the drive motor 50 are free to rotate through a limited angle around the axis of bearings 28 with respect to rearward projecting members 24 connected to bar 20 (an example of the second cross member in claims 1, 2 and 7) and ultimately connected in recess 22 to a steering column of the vehicle on which the assembly is used.

Figure 8:
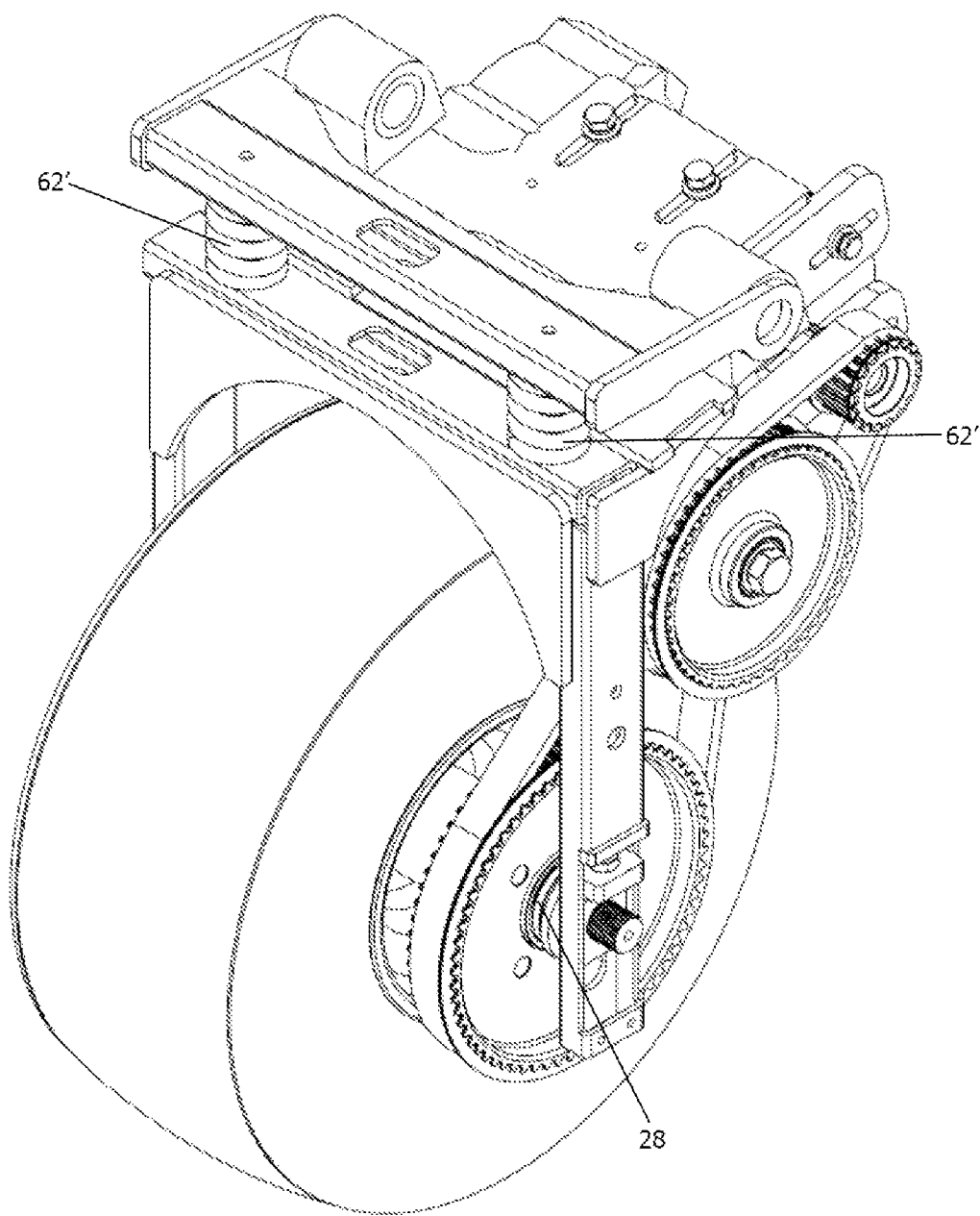
FIG. 8 is a first side perspective view of an alternate embodiment of the present invention.

Note that when the assembly shown in the Figures is used in a vehicle such as the vehicle of FIG. 1, rectangular tube 36 will be pushed upward toward rectangular tube 20, being separated there from by urethane spring 62, or alternatively as shown in FIG. 8, coil spring 62' which are selected in size and firmness to provide a desired initial deflection dependent on the load to be supported by the suspension, the intended travel of the suspension and elastic resistance to upward motion of the wheel 30. These urethane spring or coil spring are held in position by bolts 64 passing through the urethane spring or coil spring 62 and rectangular tube 36, with an upper end of"

the bolts each having a flanged head on the bolts passing through holes in and being captured by rectangular tube to limit the downward travel of the suspension, i.e., the downward travel of wheel 30 relative to the rectangular tube 20.

Thus it may be seen that urethane spring or coil spring 62 provide a cushioning affect for the wheel which will prevent or very substantially reduce the wheel bounce when traveling over a rough surface, thereby improving not only the comfort of the rider but also improving acceleration and steering under such conditions by keeping the wheel on the drive surface. The desired softness of the suspension may be selected by varying the dimensions and/or softness of the urethane or spring to provide the desired operating characteristics for the given application and load on the wheel. The net result is as good as some form of spring and shock absorber mount would be, and is a very substantial improvement over just effectively rigidly connecting the drive wheel to the vehicle and is substantially less expensive than a coil spring shock absorber assembly construction would be.

Thus the present invention has a number of aspects, which aspects may be practiced alone or in various combinations or sub-combinations, as desired. While a preferred embodiment of the present invention has been disclosed and described herein for purposes of illustration and not for purposes of limitation, it will be understood by those skilled in the art that various changes in form and detail may be made therein without departing from the spirit and scope of the invention.

What is claimed is:

1. A drive wheel and suspension for a vehicle comprising:
   a first cross member;
   a pair of spaced apart, downward projecting parallel struts fastened to the first cross member;
   a motor mount projecting rearward from the assembly of the first cross member, the spaced apart, downward projecting parallel struts, rearward being the direction opposite the forward motion of the vehicle on which the drive wheel and suspension is used;
   a motor mounted on the motor mount for driving a motor shaft in rotation about a first axis;
   a wheel coupled to and between the downward projecting parallel struts adjacent a lower end thereof for rotation about a second axis parallel to the first axis;
   a first pulley on the motor shaft;
   a second pulley aligned with the first pulley and disposed for rotation about a third axis parallel to the first and second axes;
   a third pulley mechanically coupled to the second pulley so as to driven in rotation by the second pulley;
   a fourth pulley aligned with the third pulley and mechanically coupled to the wheel to drive the wheel in rotation about the third axis;
   a first belt coupling the first and second pulleys; and
   a second belt coupling the third and fourth pulleys;
   the foregoing parts forming a first assembly;
   a second cross member above the first cross member;
   the second cross member having a pair of arms projecting rearward, the second cross member and the pair of rearward projecting arms forming a second assembly;
   the second assembly being coupled to the first assembly adjacent the rearward projecting ends of each of the pair of arms through bearings allowing the first and second assemblies to pivot relative to each other about a fourth axis parallel to the first through third axes, and;
   at least one elastic member between the first and second cross members.

2. The drive wheel and suspension of claim 1 wherein the at least one elastic member comprises a pair of elastic members, one adjacent each end of the first and second cross members.

3. The drive wheel and suspension of claim 1 wherein the elastic member is a polymer.

4. The drive wheel and suspension of claim 1 wherein the polymer is a polyurethane.

5. The drive wheel and suspension of claim 1 wherein the elastic member is a spring.

6. The drive wheel and suspension of claim 1 wherein the pulleys and the belts are toothed pulleys and belts.

7. The drive wheel and suspension of claim 1 wherein the second cross member includes a socket for fastening to a steering post.

8. The drive wheel and suspension of claim 1 wherein the motor is mounted on the motor mount so as to be adjustable in position in a direction parallel to the first axis, whereby the first belt may be tensioned.

9. The drive wheel and suspension of claim 1 wherein the wheel is adjustable in position along the downward projecting parallel struts in a direction parallel to the second axis, whereby the second belt may be tensioned.

\* \* \* \* \*